(12) United States Patent
Vänttinen (10) Patent No.: US 7,349,363 B2
(45) Date of Patent: Mar. 25, 2008

(54) METHOD OF TRANSMITTING SERVICE INFORMATION, AND RADIO SYSTEM

(75) Inventor: Veijo Vänttinen, Espoo (FI)

(73) Assignee: Nokia Mobile Phones Ltd. (FI)

( * ) Notice: Subject to any disclaimer, the term of this patent is extended or adjusted under 35 U.S.C. 154(b) by 898 days.

(21) Appl. No.: 09/799,914

(22) Filed: Mar. 5, 2001

(65) Prior Publication Data

US 2001/0024433 A1    Sep. 27, 2001

(30) Foreign Application Priority Data

Mar. 6, 2000    (FI)    .................................. 20000509

(51) Int. Cl.
*H04Q 7/00* (2006.01)
(52) U.S. Cl. ...................... 370/328; 370/329; 370/441; 370/442; 455/435.1; 455/450
(58) Field of Classification Search ................ 455/437, 455/436, 438, 439, 435.1, 435.2, 435.3, 450, 455/452.2, 452.1, 453, 455, 517, 554.1, 554.2, 455/69, 556.1, 422.1; 370/338, 331, 329, 370/337, 348, 349, 328, 330, 352, 355, 356, 370/351, 389, 347, 395.2, 395.1, 229, 310, 370/321, 353, 354, 400, 401, 402, 395.21, 370/395.42, 395.43, 310.1, 310.2; 380/247, 380/249

See application file for complete search history.

(56) References Cited

U.S. PATENT DOCUMENTS

| | | | |
|---|---|---|---|
| 5,613,213 A | 3/1997 | Naddell et al. | 455/54.1 |
| 6,151,501 A | 11/2000 | Belkin et al. | 455/436 |
| 6,374,112 B1 * | 4/2002 | Widegren et al. | 455/452.2 |
| 6,377,804 B1 * | 4/2002 | Lintulampi | 455/435.2 |
| 6,389,008 B1 * | 5/2002 | Lupien et al. | 370/352 |
| 6,463,055 B1 * | 10/2002 | Lupien et al. | 370/353 |

(Continued)

FOREIGN PATENT DOCUMENTS

WO    WO 99/16266    4/1999

(Continued)

OTHER PUBLICATIONS

GSM 03.71: Location Services (LCS); Functional Description—Stage 2 in paragraph 7.6.1, pages 34-36.

*Primary Examiner*—Wing Chan
*Assistant Examiner*—Robert C Scheibel
(74) *Attorney, Agent, or Firm*—Connolly Bove Lodge & Hutz LLP (57) ABSTRACT

The invention relates to a radio system which transmits packet traffic and to a method of transmitting service information flexibly between a network part and a terminal in a radio system which transmits packet traffic and in which a connection set-up process is activated by a session management arrangement when a connection is established between the terminal (402) and the network part (400). When service information is transmitted between the network part and the terminal, the party needing service activates the connection set-up process and during activation the party needing service indicates the need for service information and the quality of service with a message (602). The party providing service responds with one or more messages (606) which include service information. The connection set-up process is finished without establishing a connection. This way radio path resources can be saved.

10 Claims, 5 Drawing Sheets

U.S. PATENT DOCUMENTS

| | | | |
|---|---|---|---|
| 6,501,741 B1 * | 12/2002 | Mikkonen et al. | 370/310 |
| 6,519,461 B1 * | 2/2003 | Andersson et al. | 455/453 |
| 6,535,979 B1 * | 3/2003 | Vialen et al. | 713/163 |
| 6,542,516 B1 * | 4/2003 | Vialen et al. | 370/465 |
| 6,608,832 B2 * | 8/2003 | Forslow | 370/353 |
| 6,618,591 B1 * | 9/2003 | Kalliokulju et al. | 455/452.2 |
| 6,636,502 B1 * | 10/2003 | Lager et al. | 370/352 |
| 6,671,511 B1 * | 12/2003 | Forssell et al. | 455/452.1 |
| 6,693,892 B1 * | 2/2004 | Rinne et al. | 370/348 |
| 6,771,964 B1 * | 8/2004 | Einola et al. | 455/437 |
| 6,870,820 B1 * | 3/2005 | Forssell et al. | 370/328 |
| 6,898,194 B1 * | 5/2005 | Vedrine | 370/329 |
| 2003/0148774 A1 * | 8/2003 | Naghian et al. | 455/456 |

FOREIGN PATENT DOCUMENTS

WO     WO 00/78080 A1     12/2000

* cited by examiner

METHOD OF TRANSMITTING SERVICE INFORMATION, AND RADIO SYSTEM

FIELD THE INVENTION

The invention relates to a radio system which transmits packet traffic and to a method of transmitting service information in a radio system which transmits packet traffic.

BACKGROUND OF THE INVENTION

One significant deficiency in the present radio systems and in those under development is the limited amount of radio resources available. The number of radio frequencies is limited and they are divided between several systems and operators. Various solutions have been introduced to solve this problem.

Prior art radio systems intended for general use are based on the circuit-switched technique. In systems implemented according to this technique a certain channel is reserved for a connection between the devices. This channel is available to the devices for the whole duration of the connection regardless of whether there is continuous traffic on the channel or not. This solution has been sufficient for systems which transmit mainly speech. As the need for telecommunications grows, transmission connections will be increasingly used for transmitting data. The traffic to be transmitted on data connections is often very bursty, i.e. at times a lot of data is transmitted, which requires high transmission capacity, whereas at times there is little traffic on the channel. For such connections packet-switched connections are a very practical solution in respect of the use of capacity. In packet-switched connections the channel is not reserved for terminals for the whole duration of the connection, but the channel is reserved only when data needs to be transmitted. Various radio systems utilizing packet-switched traffic have been developed in which at least some of the connections between terminals are established using a packet protocol. Examples of these systems are the GPRS (General Packet Radio System) and its improved version EGPRS (Enhanced General Packet Radio System).

Since data services and their need for data transmission capacity differ from one another, several systems are provided with the ability to establish connections with different capacities. In the case of typical data connections the terminal is connected to a data network via the Internet, for example. The systems are provided with a session management arrangement, which defines the connection set-up process. The data connection needed between the terminal and the network part of the system is established in the connection set-up process.

The use of radio systems for various purposes has increased significantly during the past few years and numerous services have been developed for them. This trend is expected to continue. Most of the new services do not necessarily require a connection between the terminal and the system. One reason for this is that the amount of information to be transmitted may be rather small and the connection needed for the service between the network part and the terminal does not require continuous data transmission but data is transmitted only for a short period.

In the existing systems that utilize the packet traffic, a connection is always established between the terminal and the network part of the system via the session management arrangement; only the quality and capacity of the connection may vary according to the need. This method is thus inflexible and may waste transmission capacity.

BRIEF DESCRIPTION OF THE INVENTION

The object of the invention is to provide a method and a radio system which enable flexible transmission of service information in the system without wasting capacity. This is achieved with a method according to the invention, i.e. with a method of transmitting service information between a network part and a terminal in a radio system which transmits packet traffic and in which a connection set-up process is activated by a session management arrangement when connection is established between the terminal and the network part. When service information is transmitted between the terminal and the network part in the method according to the invention, the party needing service activates a connection set-up process, during activation the party needing service indicates the need for service information and the quality of service with a message, the party providing service responds with one or more messages which include service information, the connection set-up process is finished without establishing a connection.

The invention also relates to a radio system which transmits packet traffic and in which a terminal and a network part are arranged to activate a connection set-up process by means of a session management arrangement when a connection is established between the terminal and the network part. In the system according to the invention, the party needing service is arranged to activate a connection set-up process when it needs transmission of service information, transmit the need for service information and the quality of service in a message, and the party providing service is arranged to respond with one or more messages which include service information, and the terminal and the network part are arranged to finish the connection set-up process without establishing a connection.

The method and system of the invention provide several advantages. One connection set-up process can be used both for establishing actual data connections and for transmitting services that do not require an actual connection. Since connections need not be established for each service, management of resources is more flexible and resources are not wasted. Thanks to the flexibility of the connection set-up process, new services can be easily introduced into the system.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
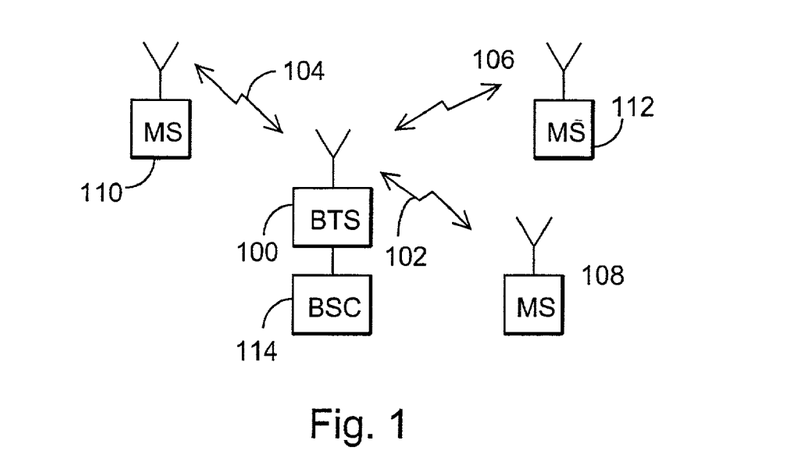
FIG. 1 illustrates a telecommunications system in which the invention can be applied.

The present invention can be applied in various radio systems which transmit packet traffic and in which the terminals are provided with different radio path properties. It is irrelevant which multiple access method the system employs. For example, the CDMA, WCDMA and TDMA can be used as the multiple access method. Furthermore, the system can support both circuit-switched and packet-switched connections. FIG. 1 illustrates a digital data transmission system in which the solution according to the invention can be applied. This is part of a cellular radio system, which comprises a base station 200, which has a bi-directional connection 202 to 206 to subscriber terminals 208 to 212. The base station is further connected to a base station controller 214, which transmits the terminal connections to other parts of the network. In the simplified example of FIG. 2 the connections may include both circuit-switched and packet-switched connections.

The structure of a mobile communication system used as the example of preferred embodiments of the invention will be described in the following with reference to FIG. 2. The main parts of the mobile communication system are a core network CN, a terrestrial radio access network BSS and a subscriber terminal MS. In this example the interface between the CN and the BSS is called a Gb interface, and the interface between the BSS and the MS a Um interface.

The radio access network consists of base station subsystems BSS. Each base station subsystem BSS consists of a base station controller BSC and one or more base transceiver stations BTS which comprise transceivers. The interface between the base station controller BSC and the base transceiver station BTS has not been standardized. The coverage area of the base station, i.e. a cell, is marked with C in FIG. 3.

Figure 2:
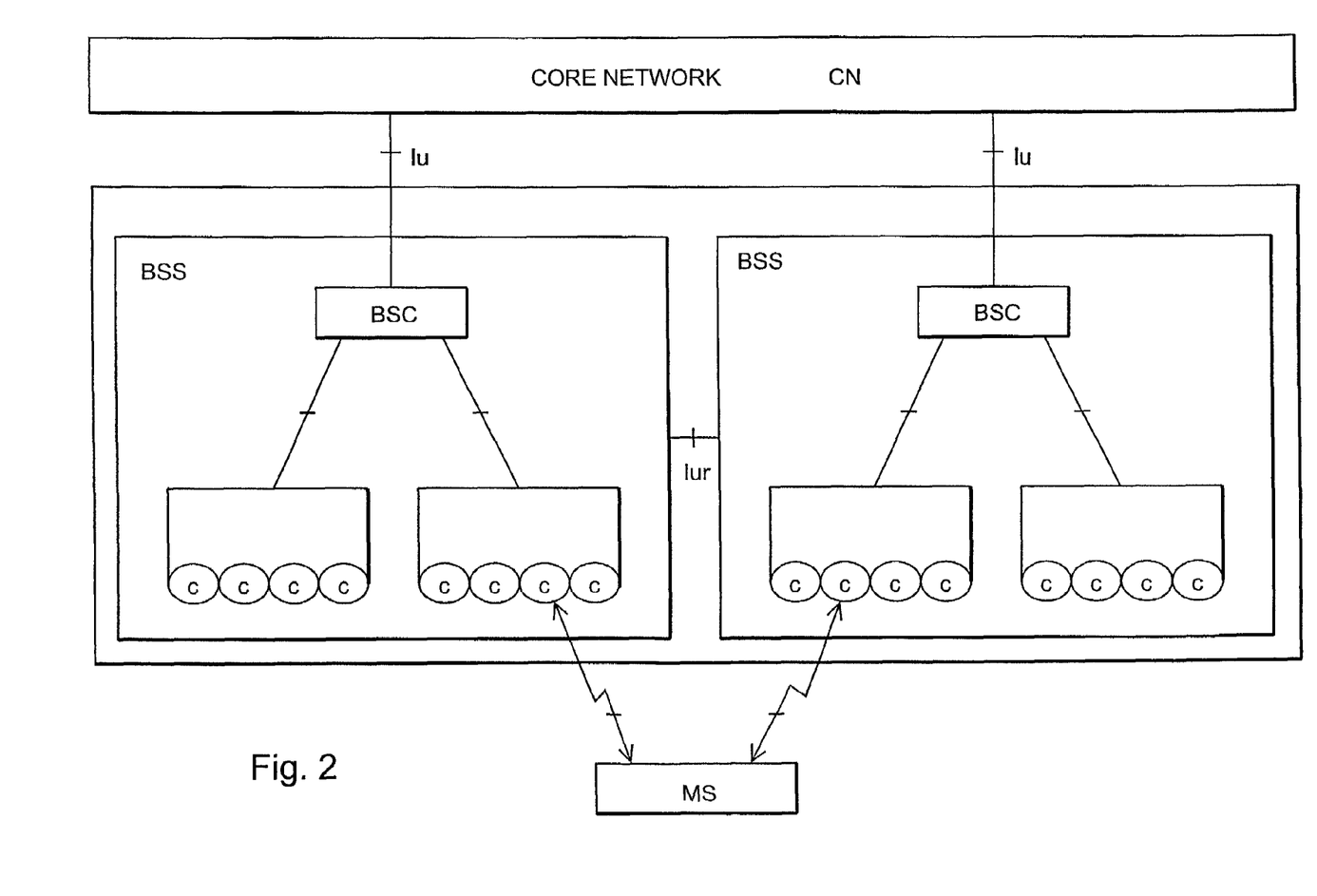
FIG. 2 illustrates the structure of another mobile communication system used as an example.
Figure 3:
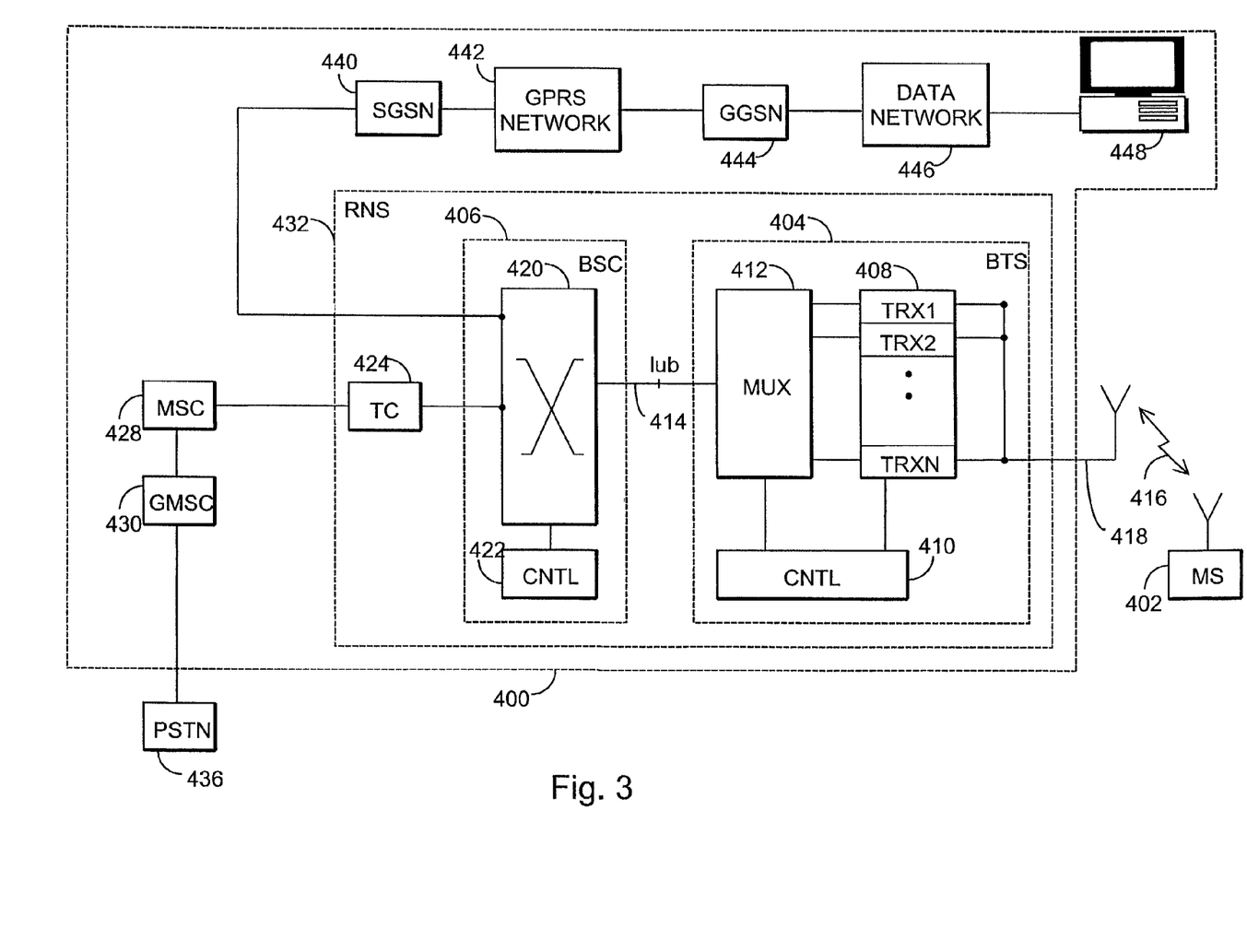
FIG. 3 is a more detailed view of the structure of the mobile communication system used as the example.

The illustration in FIG. 2 is rather abstract, for which reason it will be clarified with a more detailed example of the cellular radio system in FIG. 3. FIG. 3 includes only the most essential blocks, but it is clear to a person skilled in the art that a conventional cellular radio network also comprises other functions and structures that need not be discussed more closely in this context. It should also be noted that FIG. 3 shows only one feasible structure. In systems according to the invention the details may differ from those shown in FIG. 2, but these differences are irrelevant to the invention.

The cellular radio network typically comprises the infrastructure of a fixed network, i.e. a network part 400 and subscriber terminals 402 which can be fixed, placed in a vehicle or portable. The network part 400 comprises base stations 404. The base station corresponds to node B in the preceding figure. Several base stations 404 are controlled centrally by a base station controller 406 which communicates with the base stations. The base station 404 comprises transceivers 408 and a multiplexer unit 412.

The base station 404 further comprises a control unit 410 which controls the function of the transceivers 408 and the multiplexer 412. The multiplexer 412 is used for arranging the traffic and control channels used by several transceivers 408 on one transmission connection 414. The transmission connection 414 forms an interface called Iub.

From the transceivers 408 of the base station 404 there is a connection to an antenna unit 418, which establishes a bi-directional radio connection 416 to the subscriber terminal 402. The structure of the frames to be transmitted on the bi-directional radio connection 416 is system-specific, and called an air interface Um.

The base station controller 406 comprises a group switching field 420 and a control unit 422. The group switching field 420 is used for switching speech and data and for connecting signaling circuits. A radio network subsystem 432 formed by the base station 404 and the radio network controller 406 also includes a transcoder 424. The transcoder 424 is usually located as close to a mobile services switching center 428 as possible because this saves transmission capacity when speech is transmitted in the format of a cellular radio network between the transcoder 424 and the radio network controller 406.

The transcoder 424 converts the different digital speech encoding formats used between the public switched telephone network and the radio telephone network into a compatible format, e.g. from the format of the fixed network into a format of the cellular radio network, and vice versa. The controller unit 422 is responsible for call controlling, mobility management, collection of statistics and signaling.

FIG. 3 also illustrates a mobile services switching center 428 and a gateway mobile services switching center 430 which is responsible for external connections of the mobile communication system, in this case for the connection to the public switched telephone network 436.

As seen in FIG. 3, the group switching field 420 can establish connections both to the public switched telephone network (PSTN) 436 via the mobile services switching center 428 and to the packet transmission network 442.

The connection between the packet transmission network 442 and the group switching field 420 is established by a support node 440 (SGSN=Serving GPRS Support Node). The function of the support node 440 is to transmit packets between the base station system and a gateway node (GGSN=Gateway GPRS Support Node) 444 and keep a record of the location of the subscriber terminal 402 in its area.

The gateway node 444 connects a public packet transmission network 446 and the packet transmission network 442. An Internet protocol or an X.25 protocol can be used at the interface. The gateway node 444 hides the internal structure of the packet transmission network 442 from the public packet transmission network 446 by encapsulating the structure, and thus the public packet transmission network 446 regards the packet transmission network 442 as a sub-network which comprises a subscriber terminal 402 to which the public packet transmission can send packets and receive packets from it.

The packet transmission network 442 is typically a private network which utilizes the Internet protocol and carries signaling and tunneled user data. The structure of the network 442 may vary according to the operator in respect of its architecture and protocols below the Internet protocol layer.

The public packet transmission network 446 may be e.g. the worldwide Internet network, there being a terminal 448, e.g. a server computer, connected to the Internet which wants to transmit packets to the subscriber terminal 402.

Time slots not involved in circuit-switched transmission are typically used for packet transmission at the air interface 416. The capacity is reserved dynamically for packet transmission, i.e. as a data transmission request is received, any free channel can be allocated to packet transmission. The arrangement is flexible, which means that circuit-switched connections have priority over packet transmission connections. If necessary, circuit-switched transmission overrides packet-switched transmission, i.e. the time slot used by packet-switched transmission is allocated to circuit-switched transmission. This can be done because packet-switched transmission withstands such interruptions well: transmission is continued using another allocated time slot. The arrangement can also be implemented so that no absolute priority is given to circuit-switched transmission but both circuit-switched and packet-switched transmission requests are served in their order of arrival. These arrangements are not, however, relevant to the present invention.

Figure 4:
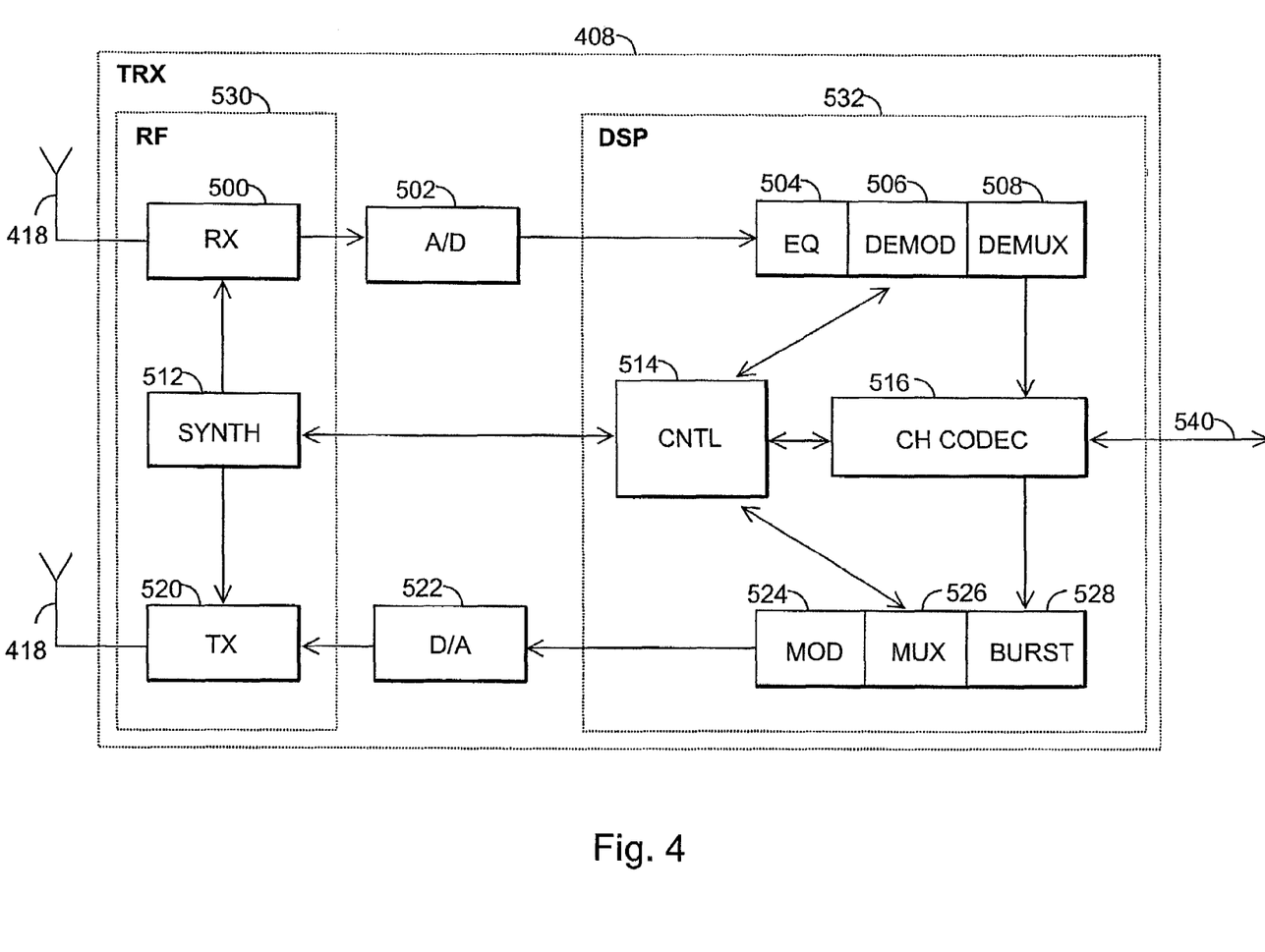
FIG. 4 illustrates the structure of a transceiver used in the system according to the invention.

FIG. 4 illustrates a more detailed example of the structure of a transceiver 408. The receiver 500 comprises a filter which prevents frequencies outside the desired frequency band. After this, the signal is converted into an intermediate frequency or directly into the baseband in which form a signal is sampled and quantized in an analogue/digital converter 502. An equalizer 504 compensates for interference, e.g. interference caused by multi-path propagation. A demodulator 506 picks up a bit flow from an equalized signal and transmits the flow to a demultiplexer 508. The demultiplexer 508 separates the bit flow from different time slots into separate logical channels. A channel codec 516 decodes the bit flow of different logical channels, i.e. decides whether the whole bit flow consists of signaling information which is transmitted to a control unit 514, or whether the bit flow consists of speech which is forwarded 540 to the transcoder 424 of the base station 406. The channel codec 516 also corrects errors. The control unit 514 performs internal control tasks by controlling different units. A burst generator 528 adds a training sequence and tail bits to the data received from the channel codec 516. A multiplexer 526 indicates a time slot for each burst. A modulator 524 modulates digital signals to a radio-frequency carrier wave. This function is analogue and thus a digital/analogue converter 522 is needed to perform it. A transmitter 520 comprises a filter for limiting the bandwidth. The transmitter 520 also controls the output power of transmission. A synthesizer 512 provides different units with the necessary frequencies. The clock of the synthesizer 512 may be controlled locally or from somewhere else in a centralized manner, e.g. from the base station controller 506. The synthesizer 512 generates the necessary frequencies e.g. by a voltage-controlled oscillator.

As illustrated in FIG. 4, the structure of a transceiver can be further divided into radio frequency parts 530 and a digital signal processing processor with software 532. The radio frequency parts 530 comprise the receiver 500, transmitter 520 and synthesizer 512. The digital signal processing processor and its software 532 include the equalizer 504, demodulator 506, demultiplexer 508, channel codec 516, control unit 514, burst generator 528, multiplexer 526 and modulator 524. The analogue/digital converter 502 is needed to convert an analogue radio signal into a digital radio signal and the digital/analogue converter 522 is needed to convert a digital signal into an analogue signal.

The structure of the subscriber terminal 402 can also be described utilizing the illustration of the transceiver 408 shown in FIG. 4. The components of the subscriber terminal 402 have the same functions as those of the transceiver 408. In addition to what has been stated above, the subscriber terminal may comprise a duplex filter between the antenna 418 and the receiver 500 and the transmitter 502, user interface parts and a speech codec. The speech codec is connected to the channel codec 516 via a path 540. Functions according to the preferred embodiments of the invention are typically implemented in the terminal by software, i.e. by including software comprising the necessary commands in the control unit of the terminal.

Figure 5:
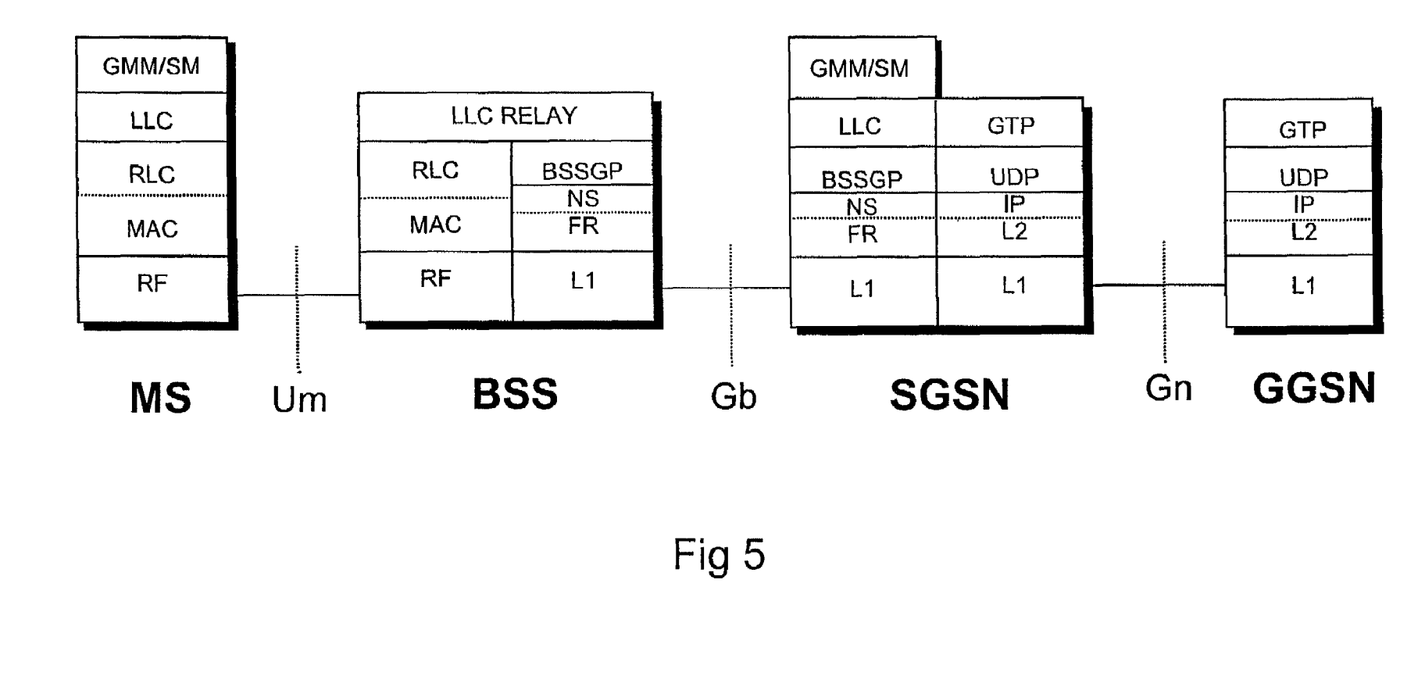
FIG. 5 illustrates protocol stacks of certain parts of the cellular radio network.

FIG. 5 illustrates control plane protocol stacks of the EGPRS. It should be noted that the embodiments are not limited to the EGPRS. The protocol stacks have been formed according to the OSI model (Open Systems Interconnection) of the ISO (International Standardization Organization). In the OSI model protocol stacks are divided into layers. In principle, there may be seven layers. FIG. 5 shows which protocol sections are processed in each network element. The network elements illustrated in the figure are a subscriber terminal MS, a base station system BSS, a support node SGSN and a gateway node GGSN. The base station and the base station controller are not illustrated separately because an interface has not been defined between them. In principle, the protocol handling defined for the base station system BSS can be divided freely between the base station 404 and the base station controller 406, but in practice not between the transcoder 424, even though it belongs to the base station system BSS. Different network elements are separated by interfaces Um, Gb and Gn between them.

The layer in each device MS, BSS, SGSN, GGSN communicates logically with a layer in another device. Only the lowest physical layers communicate directly with one another. The other layers always use the services provided by the next lower layer. Thus a message has to physically travel in the vertical direction between the layers, and only in the lowest layer the message travels in the horizontal direction between the layers.

The actual bit-level data are always transmitted using the first physical layer RF, L1. The mechanical, electric and functional properties needed to access a physical transmission path are defined in the physical layer. The second layer, i.e. the data link layer, uses the services of the physical layer to provide reliable data transmission, and corrects e.g. transmission errors. At the air interface 416 the data link layer is divided into an RLC/MAC sub-layer and an LLC sub-layer. The third layer, i.e. the network layer, provides the upper layers with independence from data transmission and switching techniques, which are used for establishing a connection between the devices. The network layer is responsible for establishment, maintenance and release of a connection, for example. In the GSM the network layer is also called a signaling layer. It has two main functions: it routes messages and enables several independent connections between two entities at the same time.

The network layer comprises a session management SM sub-layer and a GPRS mobility management GMM sub-layer.

The mobility management sub-layer GMM takes the consequences resulting from the fact that the user of the subscriber terminal moves and are not directly related to the management of radio resources. In the fixed network this sub-layer would check the user's rights and connect the user to the network. In cellular radio networks this sub-layer thus supports user mobility, registration and management of mobility data. This sub-layer also checks the identity of the subscriber terminal and the identities of allowed services. In this sub-layer messages are transmitted between the subscriber terminal MS and the support node SGSN.

The session management sub-layer SM manages all functions related to the management of a packet-switched call but it does not detect user mobility. The session management sub-layer SM establishes, maintains and releases connections. It has separate procedures for calls originating from the subscriber terminal and for calls terminating to the subscriber terminal. In this sub-layer messages are also transmitted between the subscriber terminal MS and the support node SGSN.

In the base station system BSS the messages of the session management sub-layer SM and the mobility management sub-layer GMM are processed transparently, i.e. they are only transferred to and fro.

In the network part the functions according to the preferred embodiment of the invention are advantageously implemented by software. The software including the necessary command can be inserted into the support node (SGSN).

In the solution according to the preferred embodiment of the invention, two types of procedures, which need parameters of their own, are defined for the session management arrangement: general procedures which are common to all services, and service-specific procedures.

An example of a general procedure is a service request and a response to the service request. Two messages can be defined for this procedure: SM SERVICE REQUEST and SM SERVICE RESPONSE. These preferably have the following forms:

SM SERVICE REQUEST: {parameters common to services, service-specific parameters}

SM SERVICE RESPONSE: {parameters common to services, service-specific parameters}

The messages thus contain a parameter block common to all services and a service-specific parameter block.

An example of service-specific procedures is a notification scheme, which is needed e.g. by the service for locating a terminal. The notification scheme is used e.g. in the location process of the GSM system, and the corresponding procedure can also be applied in connection with the present solution. The notification scheme is described e.g. in the specification GSM 03.71: Location Services (LCS); Functional description—Stage 2 in paragraph 7.6.1. Two messages, Location Notification Invoke and Location Notification Return Result, are described here. In the solution according to a preferred embodiment of the invention, logic states are defined for the session management to coordinate transmission of service information. The states can be defined separately for the terminal and the network part. The following states are defined for the terminal:

NON-PDP-INACTIVE—no service transmission in this state

NON-PDP-ACTIVE-PENDING—the terminal has activated transmission of service information NON-PDP-INACTIVE-PENDING—the terminal has activated termination of service information transmission NON-PDP-ACTIVE—ongoing transmission of service information The corresponding states are defined for the network part as follows:

NON-PDP-INACTIVE—no service transmission in this state

NON-PDP-ACTIVE-PENDING—the network part has activated transmission of service information NON-PDP-INACTIVE-PENDING—the network part has activated termination of service information transmission NON-PDP-ACTIVE—ongoing transmission of service information NPN-PDP-MODIFY-PENDING—the network part has requested a change in the transmission of service information.

Figure 6:
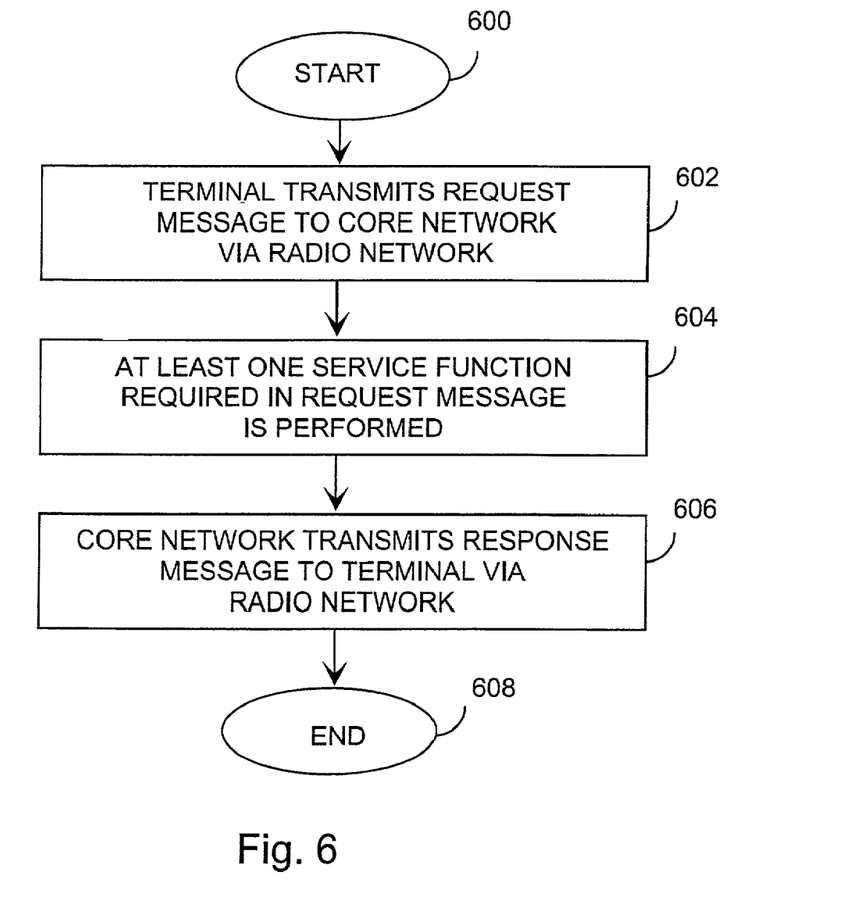
FIG. 6 illustrates a preferred embodiment of the method according to the invention.

In the following, the solution according to the preferred embodiment of the invention will be described by means of the flow chart shown in FIG. 6. It is assumed, by way of example, that the terminal needs service and service is provided by the network part. The terminal, i.e. the party needing service, sends a message in accordance with the connection set-up process to the network part. The message indicates the need for service information and the quality of service.

It is assumed in this example that the service in question is a location service, i.e. the terminal requests information on its location from the network. The GPRS (General Packet Radio System) is used as the example here without limiting the invention to it.

The process starts in block 600. In block 602 the subscriber terminal transmits a request message SM SERVICE REQUEST for location service via the radio network, i.e. the base station system BSS in our example, to the core network, i.e. the support node SGSN in our example. If desired, security procedures can be performed after this, e.g. identification of the subscriber terminal, according to the prior art. For the sake of clarity, these security procedures are not shown here.

Next at least one function of the location service requested in the message is performed according to block 604. The request message relates to one of the following location service functions: determination of the subscriber terminal location, transmission of location assistance data to the subscriber terminal, or transmission of a ciphering key for decrypting the location assistance data to the subscriber terminal. These details are irrelevant here and thus they will not be described in greater detail.

After the desired function or functions have been performed, the core network SGSN transmits a response message SM SERVICE RESPONSE to the request message to the subscriber terminal via the radio network in step 606. Then the method is finished in block 608. In this example the response message may contain at least one of the following pieces of information: the location of the subscriber terminal, location assistance data, a ciphering key for decrypting the location assistance data, an error code. The request message and the response message are messages of the protocol layers that correspond to the third layer of the OSI model.

Even though the invention has bee described with reference to the example according to the accompanying drawings, it is clear that the invention is not limited thereto but may be modified in various ways within the inventive concept disclosed in the appended claims.

The invention claimed is:

1. A method of transmitting service information between a network part and a terminal in a radio system which transmits packet traffic and in which a connection set-up process is activated by means of a session management arrangement to established a connection between the terminal and the network part, the method comprising:

activating the connection set-up process when the terminal does not have a connection with the network part by a party needing service when service information is transmitted between the network part and the terminal, coordinating transmission of service information between the network part and the terminal by using logic states defined for the session management arrangement, indicating during activation the need for service information and the quality of service with a message by the party needing service, responding with one or more messages which include service information by a party providing service, and finishing the connection set-up process without establishing a connection after the requested service information has been transmitted, wherein the session management arrangement establishes, maintains and releases connect and is located in both the network part and the terminal.

2. A method according to claim 1, wherein the message transmitted by the party needing service comprises a parameter block common to all services.

3. A method according to claim 1, wherein the message transmitted by the party needing service comprises a service-specific parameter block.

4. A method according to claim 1, wherein the one or more messages transmitted by the party providing service comprise a parameter block common to all services.

5. A method according to claim 1, wherein the one or more messages transmitted by the party offering service comprise a service-specific parameter block.

6. A radio system which transmits packet traffic, the system comprising:
   a terminal and a network part to activate a connection set-up process by means of a session management arrangement to establish a connection between the terminal and the network part,
   a party needing service to activate the connection set-up process and to transmit the need for service information and the quality of service in a message when the terminal does not have a connection with the network part and when service information needs to be transmitted,
   a party providing service to respond with one or more messages which include service information, and
   the terminal and the network part to finish the connection set-up process without establishing a connection,
   wherein the session management arrangement coordinates transmission of service information between the network part and the terminal by use of defined logic states, and
   the session management arrangement establishes, maintains and releases connections and is located in both the network part and the terminal.

7. A system according to claim 6, wherein the party providing service is the terminal and the party needing service is the network part of the system.

8. A system according to claim 6, wherein the party providing service is the network part and the party requiring service is the terminal of the system.

9. A terminal of a radio system configured to transmit packet traffic, the terminal comprising:
   an activator to activate a connection set-up process when a terminal does not have a connection with a network part by means of a session management arrangement to establish a connection between the terminal and the network part;
   a transmitter to transmit a need for service information and a quality of service in a message:
   a receiver to receive one or more messages which include service information; and
   wherein the session management arrangement coordinates transmission of service information between the network part and the terminal by use of logic states,
   the session management arrangement establishes, maintains and releases connections; and is located in the network part and the terminal and the session management arrangement finishes the connection set-up process with the network part without establishing a connection after the requested service information has been received.

10. A network element of a radio system configured to transmit packet traffic, the element comprising:
   a receiver to receive a need for service information and a quality of service in a message from a terminal of the radio system after a connection set-up process has been activated, said connection process being activated when the terminal does not have a connection part;
   a responder to respond to the message with one or more messages which include service information and to finish the connection set-up process with the terminal without establishing a connection after the requested service information has been transmitted; and
   a session management arrangement coordinates transmission of the service information by use of logic states,
   wherein the session management arrangement establishes, maintains and releases connections.

* * * * *